United States Patent [19] [11] 4,453,169
Martner [45] Jun. 5, 1984

[54] INK JET APPARATUS AND METHOD

[75] Inventor: John G. Martner, Brookfield, Conn.

[73] Assignee: Exxon Research and Engineering Co., Florham Park, N.J.

[21] Appl. No.: 366,251

[22] Filed: Apr. 7, 1982

[51] Int. Cl.³ .................... G01D 15/18; F04B 43/12

[52] U.S. Cl. .............................. 346/140 PD; 346/1.1; 417/477

[58] Field of Search .............. 346/1, 140 PD; 417/477

[56] References Cited

U.S. PATENT DOCUMENTS

| | | | |
|---|---|---|---|
| 2,693,766 | 11/1954 | Seyler . | |
| 2,917,002 | 12/1969 | Mascaro . | |
| 3,192,863 | 6/1965 | Vadot . | |
| 3,403,631 | 10/1968 | Tangeman | 417/477 X |
| 3,431,864 | 3/1969 | Jones | 103/149 |
| 4,115,036 | 9/1978 | Paterson | 417/322 |
| 4,333,088 | 6/1982 | Diggins | 346/140 PD |
| 4,359,744 | 11/1982 | Salmre | 346/140 PD X |
| 4,363,609 | 12/1982 | Cosentino et al. | 417/477 |

*Primary Examiner*—George H. Miller, Jr.
*Attorney, Agent, or Firm*—Norman L. Norris; John Jamieson, Jr.

[57] ABSTRACT

Droplets of ink are ejected from channels formed between a pair of flexible reed-like members. The transducers are coupled to the reed-like members to deform the members and eject a droplet of ink from the orifice at the end of the channel.

25 Claims, 11 Drawing Figures

INK JET APPARATUS AND METHOD

BACKGROUND OF THE INVENTION

This invention relates to ink jets and more particularly to methods and apparatus of ejecting droplets of ink for purposes of marking.

A variety of ink jets are known in the art. Typically, an ink jet comprises a chamber which communicates with a supply of ink and an orifice coupled to the chamber through which droplets of ink are ejected. In a demand ink jet device, sometimes known as an impulse ink jet, the volume of the chamber is varied in response to the state of energization of a transducer with the resulting ejection of droplets from the orifice. Typically, the tranducer communicates with a wall of the chamber which is deformable in response to energization of the transducer thereby achieving the change of volume of the chamber.

In the typical ink jet device, the deformable wall does not progressively deform along a length thereof. In other words, there is no wave-like propagation of the deformation along the wall such as that known as peristaltic motion.

Peristaltic motion deformation is, of course, known, e.g., peristaltic motion is relied upon in the digestive system of mammals. Moreover, peristaltic pumping action has been relied upon as disclosed in U.S. Pat. No. 4,115,036 Patterson. Copending application Ser. No. 203,584, filed Nov. 3, 1980 and Ser. No. 203,589 filed Nov. 3, 1980 disclose the use of peristaltic pumping in connection with a supply of ink to an ink jet chamber. However, these patent applications do not disclose ink jet chambers themselves which create a peristaltic wave-like motion for purposes of ejecting a droplet of ink.

SUMMARY OF THE INVENTION

It is an object of this invention to provide an ink jet method and apparatus which eliminates the necessity for diaphragms and orifice plates.

It is a further object of this invention to provide a reliable ink jet method and apparatus.

It is a further object of this invention to provide an ink jet method and apparatus capable of a high droplet rate of ejection.

It is a further object of this invention to provide an ink jet method and apparatus which is of relatively low cost.

It is a still further object of this invention to provide an ink jet method and apparatus which is suitable for use in an array of ink jets.

It is a more particular object of this invention to provide an array of ink jets wherein cross-talk is minimized.

In accordance with these and other objects, an ink channel is formed. At least one wall of the ink channel is deformable such that the deformation may advance along the wall so as to create a peristaltic action resulting in the ejection of a droplet of ink from the channel through an orifice.

In the preferred embodiment of the invention, the channel includes a pair of opposing walls which are deformed. The walls may comprise elongated members such as reeds. The reeds may be mounted in a clamping member at one end and the opposite ends of the reeds form the orifice. Transducer means in the form of piezoelectric bimorphs are coupled to each of the reeds so as to create a wave-like peristaltic motion when the reeds are deformed. The clamping member may comprise a block which includes a reservoir or supply of ink which is coupled to the channel. The transducers associated with the reeds are energized out of phase so as to deform the reeds in opposite directions.

DETAILED DESCRIPTION OF A PREFERRED EMBODIMENT

Figure 1:
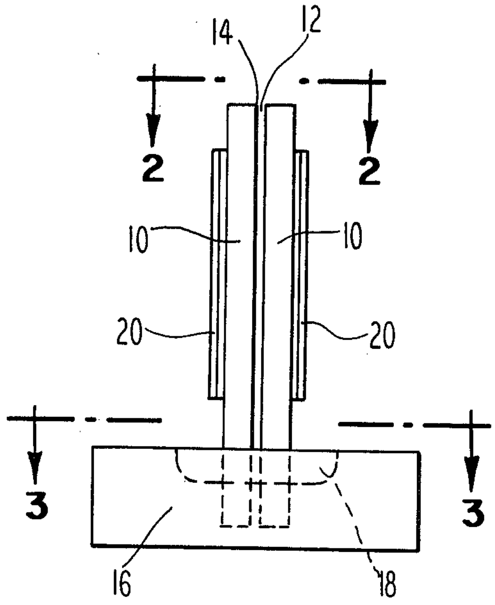
FIG. 1 is an elevational view of the preferred embodiment of the invention.
Figure 2:
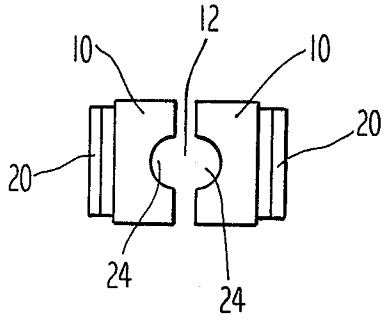
FIG. 2 is a view of the embodiment shown in FIG. 1 taken along line 2—2.

Referring to FIGS. 1–4, a demand ink jet apparatus comprising a pair of juxtaposed flexible members 10 form an elongated channel 12 therebetween for receiving ink to be ejected as droplets from an orifice 14 at the distal end of the members 10. The flexible members 10 are mounted on a support means 16 and received within an opening in the support means so as to provide cantilevered support of the flexible members. Ink is supplied to the channel 12 through a recess 18 in the support means 16. It will be understood that the support means 16 in essence comprises a block.

Each of the flexible members 10 is associated with and coupled to a bimorph piezoelectric transducer 20. When the transducers 20 are energized, a peristaltic deflection is achieved along the length of the transducers 20 so as to propel ink through the channel 12 and eject droplets from the orifice 14 on demand, i.e., upon selective energization of the transducers.

Figure 5:
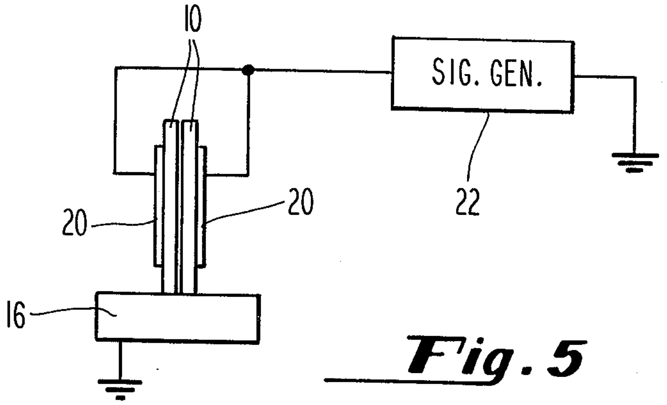
FIG. 5 is a partially schematic diagram showing the manner in which the ink jet device shown in FIGS. 1–4 is energized.

As shown in FIG. 5, the driving of the transducers 20 is achieved by a signal generator 22 which is coupled between the transducers 20 ad ground. The transducers 20 are mounted with respect to the flexible members 10 so as to be generated 180° out of phase, i.e., juxtaposed portions of the flexible members 10 are driven in opposite directions.

In the preferred embodiment of the invention, the flexible members 10 comprise reeds. Reeds include a scribed-out portion 24 which extends along the length of the members 10. In the preferred embodiment, the overall length of the reeds or elongated members 10 may range from 0.15 to 0.45 inches with 0.3 inches being preferred. The reeds or members 10 have a thickness of 0.010 to 0.030 inches as measured from the bimorph transducer 20 to the scribed-out area 24.

Figure 6:
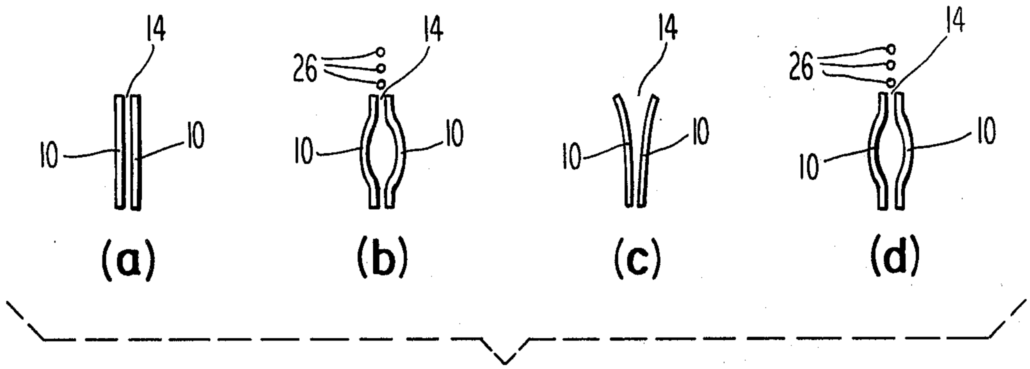
FIG. 6 is a sequential drawing showing various states of energization of the device shown in FIGS. 1–5.

Referring now to FIG. 6, the peristaltic mave motion which ejects the droplets of ink from the orifice 14 may be understood. In FIG. 6, four different times a-d are represented. At time a represented by FIG. 6*a*, the flexible members 10 are at rest. At time b represented by FIG. 6*b*, transducers associated with the flexible members 10 are energized so as to bow the central area of the members 10 outwardly away from one another which in turn constricts the channel 12 adjacent the orifice 14 so as to eject droplets of ink 26. At time c, represented by FIG. 6c, the tranducers associated with the flexible members 10 are energized so as to force flexible members 10 adjacent the support means toward one another while bending the portions of the flexible members 10 adjacent the orifice 14 outwardly away from one another. No droplets of ink are ejected at this time. However, at time d as represented by FIG. 6d, the flexible members 10 are again bowed outwardly away from one another so as to eject droplets of ink 26 from the orifice 14.

Figure 3:
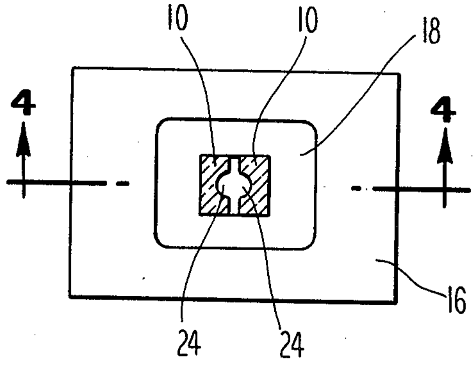
FIG. 3 is a sectional view of the embodiment shown in FIG. 1 taken along line 3—3 of FIG. 1.
Figure 4:
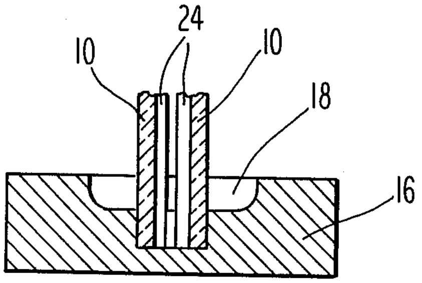
FIG. 4 is a sectional view taken along line 4—4 of FIG. 3.

From the foregoing, it will be appreciated that a wave-like motion similar to a peristaltic action is achieved along the length of the flexible members 10. This wave-like motion tends to fill the channel 12 with ink from the supply 18 as shown in FIGS. 3 and 4 and eject the droplets 26 from the orifice 14.

Figure 7:
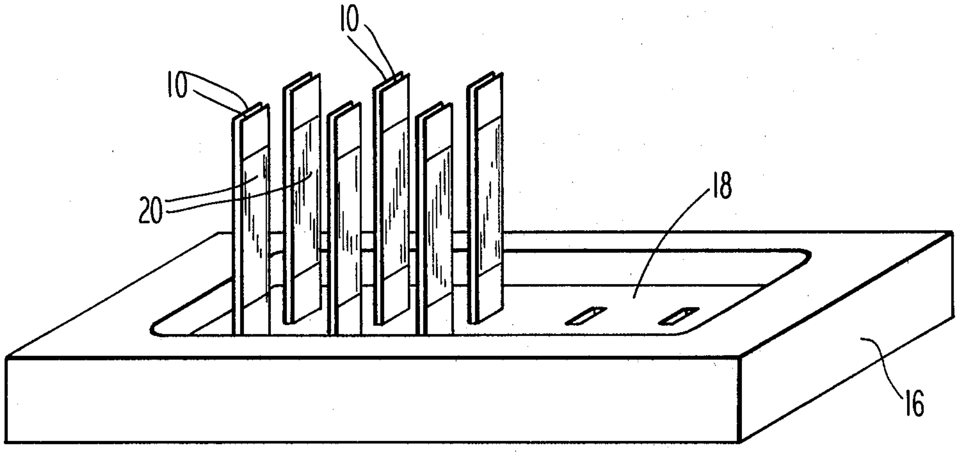
FIG. 7 is a perspective view of an array of ink jets of the type shown in FIGS. 1–6.
Figure 8:
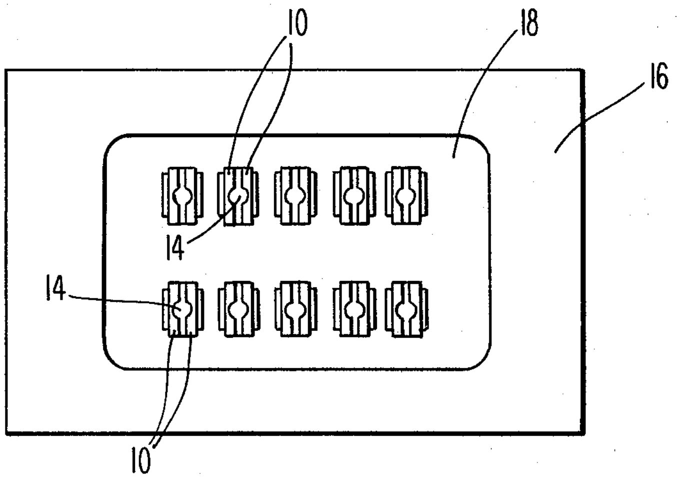
FIG. 8 is a top view of the array shown in FIG. 7.

FIG. 7 depicts a plurality of ink jets of the type shown in FIGS. 1 through 6 comprising flexible reeds 10 and transducers 20 mounted in cantilevered support on a support means 16, with proximal ends of the flexible members 10 immersed in ink within recess 18. The nature of the array formed by the members 10 may be appreciated with reference to FIG. 8 which looks downwardly at the reeds 10 and the orifices 14 formed therebetween at the distal ends thereof. It will, of course, be appreciated that a variety of arrays may be formed using flexible members or reeds 10.

It will also be appreciated that the peristaltic wave-like motion may be achieved utilizing a channel formed from a flexible member or reed 10 juxtaposed to a non-deformable member. It will also be appreciated that a variety of materials may be utilized for the flexible members or reeds 10 including metals. It will further be appreciated that the flexible members 10 may be deformed utilizing a variety of drive mechanisms including magnetic systems.

Although a particular embodiment of the invention has been shown and described and alternatives suggested, it will be appreciated that other modifications and embodiments will occur to those of ordinary skill in the art which will fall within the true scope of the invention as set forth in the appended claims.

I claim:

1. An ink jet apparatus comprising:
a flexible member juxtaposed to another member so as to form a chamber therebetween terminated in an ink ejection orifice;
support means for cantilevered support of said flexible members;
ink supply means coupled to said chamber; and
drive means coupled to said flexible member for generating a peristaltic deflection along said member and ejecting a droplet from said orifice.

2. The ink jet apparatus of claim 1 wherein said support means comprises a member receiving one end of said flexible member.

3. The ink jet apparatus of claim 2 including an opening receiving a portion of said flexible member.

4. The ink jet apparatus of claim 3 wherein one end of said flexible member is received in said opening.

5. The ink jet apparatus of claim 1 wherein said ink supply means is supported by said support means.

6. The ink jet apparatus of claim 1 wherein said support means comprises a block with an end of said flexible member inserted into said block, said block further comprising a recessed area surrounding said flexible member so as to form said ink supply means therein.

7. The ink jet apparatus of claim 1 wherein said drive means comprise a transducer coupled to said flexible member.

8. The ink jet apparatus of claim 1 wherein said drive means comprises a piezoelectric bimorph.

9. The ink jet apparatus of claim 1 wherein said flexible member comprises a flexible reed.

10. The ink jet apparatus of claim 1 wherein said flexible member includes an elongated depression opposing said other member.

11. The ink jet apparatus of claim 1 wherein said other member comprises a flexible member supported in a cantilevered manner from said support means.

12. The ink jet apparatus of claim 11 wherein said drive means comprises transducer means coupled to each said flexible member.

13. The ink jet apparatus of claim 12 wherein said drive means comprises means for driving said transducer means out of phase so as to drive juxtaposed portion of each said flexible member in opposite directions.

14. The ink jet apparatus of claim 13 wherein said transducer means comprises a piezoelectric bimorph.

15. An ink jet apparatus comprising:
an ink channel terminated in an orifice;
supply means for supplying ink to the channel; and
means for peristaltically deforming the channel so as to advance ink therethrough thereby ejecting an ink droplet from said orifice.

16. The ink jet apparatus of claim 15 wherein said channel comprises opposing reeds.

17. The ink jet apparatus of claim 16 wherein said means for peristaltically deforming comprises transducer means coupled to said reeds.

18. The ink jet apparatus of claim 17 including support means for fixedly mounting said reeds at one end remote from said orifice.

19. An ink jet apparatus comprising an array of ink jets, each of said jets comprising:
an ink channel terminated in an orifice;
supply means for supplying ink to the channel; and
means for peristaltically deforming the channel so as to advance ink therethrough so as to eject a droplet from said orifice.

20. The ink jet apparatus of claim 19 wherein said channel comprises opposing reeds.

21. The ink jet apparatus of claim 20 wherein said means for peristaltically deforming comprises transducer means coupled to said reeds.

22. The ink jet apparatus of claim 21 including support means for fixedly mounting said reeds at ends remote from said orifice.

23. A method of ejecting droplets comprising the following steps:
supplying a liquid to a channel;
deforming at least one wall of said channel;
advancing the deformation along the channel so as to create a peristaltic action; and
ejecting a droplet from the end of the channel.

24. The method of claim 23 wherein opposing walls of the channel are deformed.

25. The method of claim 24 wherein opposing walls are deformed in opposite directions.

* * * * *